United States Patent [19]

Iwasaki et al.

[11] Patent Number: 5,016,698
[45] Date of Patent: May 21, 1991

[54] PNEUMATIC RADIAL TIRES WITH IMPROVED POLYVINYL ALCOHOL BELT CORDS

[75] Inventors: Shizuo Iwasaki; Norio Inada, both of Kodaira, Japan

[73] Assignee: Bridgestone Corporation, Tokyo, Japan

[21] Appl. No.: 570,560

[22] Filed: Aug. 21, 1990

[30] Foreign Application Priority Data

Aug. 24, 1989 [JP] Japan .................................. 1-216114
Feb. 20, 1990 [JP] Japan .................................. 2-37157

[51] Int. Cl.$^5$ ............................ B60C 9/20; B60C 9/26
[52] U.S. Cl. ...................................... 152/527; 152/451
[58] Field of Search ...................... 152/451, 527, 556; 57/902

[56] References Cited

U.S. PATENT DOCUMENTS 4,793,131 12/1988 Mizuno ............................... 152/451
4,934,427 6/1990 Oshima et al. ..................... 152/451
4,971,127 11/1990 Oshima et al. ..................... 152/527

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

A pneumatic radial tire having improved comfortability and durability comprises a belt composed of at least two belt reinforcing layers, one of which layers contains high strength and high modulus polyvinyl alcohol fiber cords having particular properties.

5 Claims, 1 Drawing Sheet

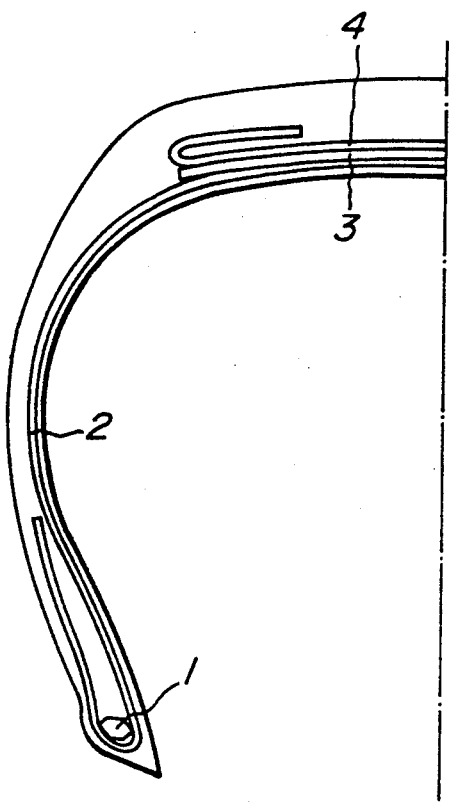
FIG._1
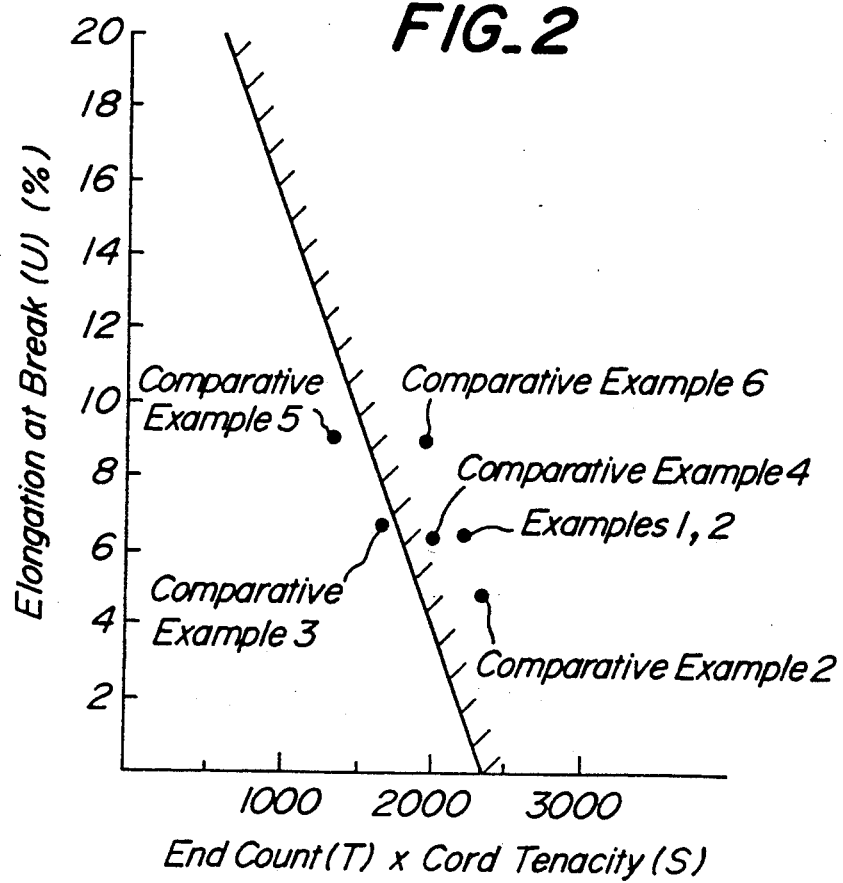
FIG._2

PNEUMATIC RADIAL TIRES WITH IMPROVED POLYVINYL ALCOHOL BELT CORDS

BACKGROUND OF THE INVENTION

1. Field of the Invention

This invention relates to pneumatic radial tires, and more particularly to a pneumatic radial tire provided with at least one layer of polyvinyl alcohol fiber cords as a belt reinforcing layer and having improved comfortability and durability.

2. Related Art Statement

The belt reinforcing layer in the pneumatic radial tire enhances the rigidity of tire tread portion to considerably improve the steering stability, wear resistance and low fuel consumption based on the rolling resistance in the tire.

Therefore, steel cords were mainly used as the conventional belt reinforcing layer, but organic fibers such as aramid fiber, rayon fiber, polyester fiber, polyvinyl alcohol fiber (PVA fiber) and the like were partly used.

In the case of steel cord, the aforementioned function is sufficiently achieved, but there are some problems in that the comfortability becomes poor due to high flexural rigidity of the tread portion, the rolling resistance is increased with the increase of tire weight as a whole to increase the fuel consumption being recently regarded as important, and water penetrates into the inside of the tire from a cut portion formed in the tread portion to cause corrosion of steel cord.

In order to overcome such problems of the steel cord, the organic fiber cord being naturally flexible and light and not causing corrosion is expected to be used as a belt reinforcing layer. However, rayon and polyester fiber cords conventionally used in the belt reinforcing layer are low in the modulus of elasticity as compared with the steel cord, so that they have a drawback that the hoop effect as the belt reinforcing layer itself is insufficient and the steering stability and wear resistance are poor.

Furthermore, when the aramid fiber cord having a high elasticity is used in the belt reinforcing layer, the hoop effect near so that of the steel cord is obtained. However, the flexibility of the organic fiber is not sufficiently developed because the dynamic modulus of the aramide fiber is too high, so that the comfortability is not improved. Furthermore, the fatigue resistance and the adhesion force, particularly adhesion force at high temperature, are low, so that the durability of the tire is not yet sufficient.

As to the PVA fiber, there has recently been found a method in which high strength and high modulus PVA fibers can relatively easily be supplied in a great amount (e.g. Japanese Patent laid open No. 60-126311 and No. 60-126312), whereby the use of PVA fiber as tire cord becomes possible, but there remains an anxiety in the safety of the tire in case of usual use method. That is, when the tenacity and elongation at break or end count of the cord are unsuitable in the tire using the high strength and high modulus PVA fiber as a cord for the belt, if the tire rides over stones on rough road or projections on road, partial breakage of the belt cords inside the tire is caused, so that such a fiber cord has a problem in tire safety. However, when the end count of the cords in the belt is increased for preventing the cord breakage, the separation failure is apt to be caused at the belt end.

SUMMARY OF THE INVENTION

The inventors have made various studies with respect to the high strength and high modulus PVA fiber for solving the above problems and found that the tire safety can be sured by restricting the properties of this fiber as a cord for the belt reinforcing layer and the structure of such belt layer, and as a result the invention has been accomplished.

According to the invention, there is the provision of a pneumatic radial tire comprising at least two belt reinforcing layers, at least one of which layers being a belt reinforcing layer composed of high modulus polyvinyl alcohol fiber cords or PVA fiber cords embedded in rubber, characterized in that a cord tenacity S (kg) and a cord elongation at break U (%) of said PVA fiber cord taken out from said belt reinforcing layer and an end count T per 5 cm of said belt reinforcing layer at a crown center portion satisfy the following relationship:

$$12(S \times T) + 1000U > 28000 \qquad (1),$$

and a cord diameter L (mm) of said PVA fiber cord and said end count T per 5 cm satisfy the following relationship:

$$(L \times T)/50 \times 100 < 80 \qquad (2),$$

and a dynamic modulus of elasticity E' at 100° C. and 30 Hz of said PVA fiber cord taken out from said belt reinforcing layer satisfies the following relationship:

$$0.7 \times 10^{11} dyn/cm^2 < E' < 2.0 \times 10^{11} dyn/cm^2 \qquad (3).$$

In a preferred embodiment of the invention, E' of the PVA fiber cord satisfies $1.0 \times 10^{11} dyn/cm^2 < E' < 1.5 \times 10^{11} dyn/cm^2$.

BRIEF DESCRIPTION OF THE DRAWINGS

The invention will be described with reference to the accompanying drawings, wherein:

FIG. 1 is a schematic sectional view of the pneumatic radial tire according to the invention; and FIG. 2 is a graph showing a relation between end count × cord tenacity and elongation at break in a non-breakage region of the cord.

DESCRIPTION OF THE PREFERRED EMBODIMENTS

In the following Table 1 are shown results measured on the properties of high strength and high modulus PVA fiber cord used in the invention together with those of the other conventional fiber cords for the belt reinforcing layer.

TABLE 1

| Kind of cord | Aramide fiber | Rayon fiber | Polyester fiber | High strength and high modulus PVA fiber | High strength and high modulus crosslinked PVA fiber |
|---|---|---|---|---|---|
| Denier (D) | 1500/2 | 1650/2 | 1500/2 | 1500/2 | 1500/2 |
| Twisting number | 32 × 32 | 29 × 29 | 30 × 30 | 31 × 31 | 31 × 31 |

TABLE 1-continued

| Kind of cord | Aramide fiber | Rayon fiber | Polyester fiber | High strength and high modulus PVA fiber | High strength and high modulus crosslinked PVA fiber |
|---|---|---|---|---|---|
| (turns/10 cm) | | | | | |
| Cord strength (g/d)*[1] | 15.0 | 6.6 | 8.0 | 12.0 | 12.0 |
| Cord dynamic modulus (dyn/cm$^2$)*[1] | $2.5 \times 10^{11}$ | $0.4 \times 10^{11}$ | $0.5 \times 10^{11}$ | $1.2 \times 10^{11}$ | $1.2 \times 10^{11}$ |
| Fatigue resistance (retention of tenacity) (%) | 40 | 72 | 80 | 70 | 80 |
| Adhesion force at room temperature (kg/cord) | 2.0 | 2.8 | 1.8 | 2.8 | 2.8 |
| Adhesion force at high temperature of 100° C. (kg/cord) | 0.4 | 2.0 | 0.4 | 1.8 | 1.8 |

*[1]Cord properties were measured after the cord was taken out from the reinforcing layer embedded in rubber. Cord dynamic modulus E' was measured at 100° C. and 30 Hz.

The adhesive treatment of the cord in Table 1 was carried out as follows. Each of the rayon fiber and the high strength and high modulus PVA fiber was immersed in a usual resorcin/formaldehyde/latex (RF/L) series adhesive, dried and subjected to a heat treatment. The polyester fiber was immersed in a mixed solution of sulfur-modified resorcin and RF/L, dried and subjected to the heat treatment. The aramid fiber was immersed in an aqueous epoxy solution before the application of RF/L series adhesive, which was dried and subjected to the heat treatment.

The measurement of fatigue resistance in Table 1 was made according to the following fatigue test. A sheet of unvulcanized rubber consisting essentially of natural rubber having a thickness of 1 mm was attached to each side of cords arranged at an end count of 24 cords/2.54 cm (24 cords/inch) to prepare a topping cord sheet of 5 cm width × 60 cm length. The topping cord sheet was attached to a steel cord sheet, and then the unvulcanized rubber was attached to upper and lower surfaces thereof so as to provide a total sample thickness of 15 mm. Then, the sheet assembly was vulcanized under a pressure of 20 kg/cm$^2$ at 145° C. for 30 minutes to prepare a vulcanizate usable for the measurement of flexural fatigue resistance. Next, the vulcanizate was attached to a pulley of 20 mm in diameter so as to face the sample cord sheet to the pulley side, and a load of 100 kg was applied to both ends thereof, which was subjected to flexural strain of 5000 times per hour at 100° C. for 4 hours. After the cord was taken out from the vulcanizate, the strength at break was measured, and a retention (%) to original strength at break calculated as a fatigue resistance of the cord.

As shown in Table 1, the high strength and high modulus PVA fiber is low in the cord tenacity and cord dynamic modulus as compared with the aramid fiber but high as compared with the rayon and polyester fibers, and considerably excellent in the fatigue resistance as compared with the aramid fiber and equal to the rayon and polyester fibers. Furthermore, in case of the aramid fiber, the adhesion force at high temperature is low, and the separation failure is apt to be caused at the belt end under the running conditions of high speed, high load, low internal pressure and the like, while the high strength and high modulus PVA fiber is good in the adhesion property to resorcin/formaldehyde/latex (RF/L) adhesive because of the presence of many OH groups bonded to the molecular chain, and also the adhesion property at high temperature is good.

The invention includes crosslinked fibers obtained by reacting the high strength and high modulus PVA fiber with a crosslinking agent as mentioned below, which has the same advantages as in the fiber not crosslinked and further improves the fatigue resistance.

The high strength and high modulus PVA fiber used in the invention is required to satisfy the relationship (1) as mentioned above. If this relationship is not satisfied, the breakage of the belt cord is apt to be caused through stones and protrusions on rough road during the running. Furthermore, even when the relationship (1) is satisfied, if the relationship (2) is not satisfied, the separation failure at belt end is apt to be caused. Moreover, if the relationship (3) is not satisfied, the steering stability is poor. On the contrary, the high strength and high modulus PVA fiber satisfying all of the relationships (1), (2) and (3) has not the above problems and improves the comfortability and the durability.

The high strength and high modulus PVA fiber used in the invention is preferable to be subjected to a crosslinking treatment. As shown in Table 1, the strength retention is improved by the crosslinking treatment, which has a good tendency to improve the tire.

The inventors have made various studies with respect to the cause that the strength of high strength and high modulus PVA fiber cord not subjected to the crosslinking treatment is decreased after the actual running of the tire containing such cords, and obtained the following knowledge. That is, it has been confirmed that the cords taken out from the tire after the actual running were embedded in an epoxy resin and cut by means of a microform and then the transverse section of the cut cord was observed and as a result the filaments in the vicinity of intersection between cable twist bundles considerably deformed to aggregate 10 or more filaments and partly cause fibrillation. This phenomenon is not observed in the polyester and aramid fibers. According to the invention, in order to improve the fatigue properties and resistances to compression, distortion, high temperature and hot water in the filament and enhance the transverse bond in fiber molecular chain, the crosslinking reaction between OH groups of adjoining polyvinyl alcohol molecules could be produced to improve the fatigue properties.

In this case, the crosslinking agent used naturally includes any substances causing the crosslinking reaction by reaction with the above OH group, but other crosslinking agents capable of producing the crosslinking between PVA molecule chains may be used. As the crosslinking agent reacting with OH group, there are mentioned aldehydes, methylol compounds, epoxy compounds, isocyanate compounds, peroxides, compounds containing a metal (Al, Ti, P, Cr, Cu or the like), and inorganic acids causing dehydration reaction.

The reaction between fiber yarn or fiber cord and crosslinking agent will be described as a method of reacting with such a crosslinking agent. In order to penetrate the crosslinking agent into the inside of the PVA fiber yarn or filaments in the cord, such a fiber is treated with the solution of the crosslinking agent. In this case, it is preferable to use the same solvent as in the spinning. As the solvent, mention may be made of dimethylsulfoxide, glycerine, ethylene glycol, propylene glycol, triethylene glycol, dimethylformamide, methyl alcohol, ethyl alcohol, phenol, n-propyl alcohol, isopropyl alcohol, water and a mixture thereof, among which the use of dimethylsulfoxide and water is favorable. For instance, when the temperature of a bath dissolving the crosslinking agent in dimethylsulfoxide or water is maintained within a range of about 50°–90° C., the amorphous portion of the PVA fiber swells to promote the penetration of the crosslinking agent into the inside of the filament. In this case, the immersing time is preferable to become longer, but is sufficient to be about 30 minutes.

After the immersion, the extra crosslinking agent remaining between the cords or onto the surface of the filament is washed out with water, alcohol or the like and then the crosslinking reaction can be made by subjecting to drying and heat treatment.

Furthermore, the crosslinked PVA fiber used in the invention may naturally be obtained by the crosslinking treatment other than the above. For example, the penetration of the crosslinking agent into the inside of the filament can be carried out at a spinning step or a solidification step after the spinning, which is more preferable in industry. When the crosslinking agent is added to the spinning solution, a spinning solution capable of dissolving 2–50% by weight of PVA is prepared, to which is discharged the crosslinking agent in an amount of not more than 1 part by weight per 100 parts by weight of PVA. As the spinning method, use may be made of dry system, wet system and dry-wet system. In general, the yarn after the spinning is passed through a solidification bath of methanol or the like, drawn and further drawn under heat treatment to conduct the crosslinking reaction. Moreover, the method of adding the crosslinking agent to the solidification bath to penetrate into the inside of the fiber can be taken instead of the addition to the spinning solution. The temperature required for the crosslinking reaction differs in accordance with the kind of the crosslinking agent used, but is usually not lower than 120° C. but preferably not higher than the melting point of the filament. Furthermore, ultraviolet ray, far-infrared ray, microwave and the like may be used for the crosslinking reaction.

When the crosslinked PVA fiber is used in the invention, the content of insoluble matter when the cord is dissolved in dimethylsulfoxide (DMSO) at 120° C. is not less than 5% by weight, preferably not less than 10% by weight, more particularly not less than 30% by weight. This content of insoluble matter indicates the degree of crosslinking between molecules. When the content of insoluble matter is less than 5% by weight, the improving effect of fatigue properties in not clear. The PVA filaments after the formation of the crosslink bond are rendered into a green cord at a twisting step. Thereafter, the green cord is subjected to a treatment with a usual RFL adhesive. As seen from Table 1, the fatigue resistance is considerably improved in the thus obtained crosslinked high strength and high modulus PVA fiber as compared with the PVA fiber not subjected to the crosslinking treatment.

Moreover, the cord tenacity S, tensile strength and cord elongation at break U according to the invention are measured at a span of 25 cm and a tensile speed of 30 cm/min according to a method of JIS L-1013. The dynamic modulus (E') of the cord is measured by using a vibron type spectrometer at a cord sample length of 3 cm under conditions of 100° C., 30 Hz, initial tension of 0.1 g/d and dynamic tension of ±0.033 g/d.

The following examples are given in illustration of the invention and are not intended as limitations thereof.

EXAMPLES 1 AND 2, COMPARATIVE EXAMPLES 1-6

Cords used in Examples 1 and 2 and Comparative Examples 1 and 2 were those shown in Table 1, and cords used in Comparative Examples 3–6 were those prepared according to the method of Example 1 and having properties shown in the following Table 2. Each of these cords was used in a second belt reinforcing layer located at a tread side of a radial tire for passenger car having two belt reinforcing layers, while steel cords were used in the first belt reinforcing layer to prepare a test tire having a tire size of 185/70 R13. Further, polyester cords of 1500 D/2 were used in a carcass ply of the tire. The structure of the tire was shown in FIG. 1, in which the second belt reinforcing layer had a fold structure that each outermost end portion of the layer in transverse direction was folded inward.

As to the tire test, the steering stability and the comfortability were evaluated by a feeling of a professional driver in the actual running test at a speed of 60–200 km/hr. The larger the value, the better the property. After the test tire was run on road consisting of 40% rough road and 60% good road under an internal pressure of 2.5 kg/cm$^2$ and a loading of 500 kg until the complete wearing of the tire, the second belt reinforcing layer portion was exposed and the number of broken cords per one tire was measured as a cord breaking property. As the durability test, the tire was run on a drum at a speed of 60 km/hr under an internal pressure of 3.0 kg/cm$^2$ and a loading of 900 kg. If troubles were not caused, the test was stopped at a running distance of 20,000 km. After the drum test, the second belt reinforcing layer was taken out to measure the presence or absence of separation at belt end. Further, a percentage of retention of tenacity of the cord after the drum test to the original tenacity of the cord was evaluated as a measure of fatigue property.

The measurement of insoluble matter in dimethylsulfoxide (DMSO) at 120° C. was carried out as follows. The PVA cords in the belt were taken out from the tire and then rubber adhered portion and RFL adhesive portion were carefully removed therefrom. Then, the PVA fibers in the cord were cut to a length of about 3 mm and about 0.05 g of the cut fibers was previously measured. Next, these cut fibers were dissolved in 50 cc of DMSO at 120° C. for 1 hour, which was filtered at hot state through a filter paper (No. 5A). The insoluble matter remaining on the filter paper was dried in air and hot dried throughly, and thereafter the weight of insoluble matter on the filter paper was measured. The ratio of the measured weight of the insoluble matter to the weight of the PVA fiber was indicated as a percentage.

The test results are shown in Table 2.

TABLE 2(a)

| | Comparative Example 1 | Comparative Example 2 | Comparative Example 3 | Example 1 | Comparative Example 4 | Comparative Example 5 | Comparative Example 6 | Example 2 |
|---|---|---|---|---|---|---|---|---|
| Kind of cord in second belt reinforcing layer | Polyester fiber | Aramide fiber | High strength and high modulus PVA fiber | High strength and high modulus PVA fiber | High strength and high modulus PVA fiber | High strength and high modulus PVA fiber | High strength and high modulus PVA fiber | High strength and high modulus crosslinked PVA fiber |
| Cord denier (D) | 1500D/2 | 1500D/2 | 1500D/2 | 1500D/3 | 1500D/2 | 1500D/2 | 1500D/3 | 1500D/3 |
| Twisting number (turns/10 cm) | 30 × 30 | 32 × 32 | 31 × 31 | 25 × 25 | 31 × 31 | 42 × 42 | 34 × 34 | 25 × 25 |
| Cord dynamic modulus E' (dyn/cm$^2$)*$^1$ | $0.5 \times 10^{11}$ | $2.5 \times 10^{11}$ | $1.2 \times 10^{11}$ | $1.2 \times 10^{11}$ | $1.2 \times 10^{11}$ | $0.55 \times 10^{11}$ | $0.55 \times 10^{11}$ | $1.2 \times 10^{11}$ |
| T: end count (cords/5 cm) | 45 | 45 | 45 | 40 | 57 | 45 | 45 | 40 |
| S: cord tenacity (kg)*$^1$ | 22 | 51 | 38 | 56 | 38 | 30 | 45 | 56 |
| U: elongation at break of cord (%)*$^1$ | 10.2 | 5.0 | 6.3 | 6.3 | 6.5 | 9.0 | 9.0 | 6.5 |
| Cord occupying ratio: L × T/50 × 100 (%) | 57 | 57 | 64 | 70 | 81 | 67 | 82 | 70 |
| Steering stability | 4 | 7 | 7 | 7 | 7 | 5 | 5 | 7 |
| Comfortability | 6 | 5 | 6 | 6 | 6 | 7 | 7 | 6 |
| 12 (S × T) + 1000 U | — | 32540 | 26820 | 33180 | 32492 | 25200 | 33300 | 33380 |
| Number of broken cords after the running on bad road | no | 0 | 8 | 0 | 0 | 6 | 0 | 0 |
| Drum test | no running | Separation failure at belt end after the running over 20,000 km | No trouble after complete running of 20,000 km | No trouble after complete running of 20,000 km | Separation failure at belt end after the running over 20,000 km | No trouble after complete running of 20,000 km | Separation failure at belt end after the running over 20,000 km | No trouble after complete running of 20,000 km |
| Retention of cord tenacity after the running on drum | no running | — | 70 | 71 | — | 82 | 86 | 85 |
| Insoluble matter in DMSO at 120° C. (%) | — | — | 0 | 0 | 0 | 0 | 0 | 10 |

*$^1$Cord properties were measured after the cord was taken out from the reinforcing layer embedded in rubber. Cord dynamic modulus E' was measured at 100° C. and 30 Hz.

The dynamic modulus of polyester fiber in Comparative Example 1 is as low as $0.5 \times 10^{11}$ dyn/cm$^2$, so that even when the cord having such a dynamic modulus is used as a belt material, the steering stability is poor and the sufficient hoop effect can not be expected.

The dynamic modulus of the aramid fiber in Comparative Example 2 is as high as $2.5 \times 10^{11}$ dyn/cm$^2$, so that the steering stability of the tire using this fiber as a belt material is good, but the comfortability is poorer as compared with the other organic fibers in Table 2. Furthermore, the tire is completely run in the drum test, but the separation failure is caused at the belt end. Moreover, the adhesion force, particularly adhesion force at high temperature is poor as shown in Table 1.

A graph showing a non-breakage region of cord in the running on bad road is shown in FIG. 2 based on the data of Table 2, in which an ordinate is an elongation at break and an abscissa is end count × cord tenacity. This shows that the breakage of cord in the belt layer is not caused in a region satisfying the relationship (1) of $12(S \times T) + 1000U > 28000$ (shadowed portion of FIG. 2) but the cord breakage occurs in a region not satisfying the above relationship (Comparative Examples 3, 5).

In Example 1, the cord is made thick under the same twisting number as compared with Comparative Example 3 and to largely increase the cord tenacity, whereby the resistance to cord breakage is enhanced. In Comparative Example 4, the cord breakage is prevented by the increasing the twisting number, but the separation failure is caused at the belt end after the drum test because the cord occupying ratio is not less than 80. In Comparative Example 5, the twisting number is increased for raising the elongation at break, but the cord tenacity and cord modulus are lowered, which does not satisfy the relationship (1), so that the breakage of the belt cord is caused and the steering stability lowers.

In Comparative Example 6, the second belt cords having a thick size under the same twisting number as in Comparative Example 5 are used, so that the cord tenacity is increased to satisfy the relationship (1), and consequently the breakage of the belt cord is not caused even in the running on bad road. However, the dynamic modulus is lowered to $0.55 \times 10^{11}$ dyn/cm$^2$ likewise Comparative example 5, so that the steering stability is degraded.

In Example 2, the high strength and high modulus PVA fiber is subjected to a crosslinking treatment, so that the retention of tenacity of the belt cord after the drum test is considerably improved as compared with Example 1 conducting no crosslinking treatment.

From the above data, the inventors have established the relationship (1) (shadowed region of FIG. 2) as a condition causing no breakage of belt cord.

The technique of the invention preventing the occurrence of cord breakage in the running on bad road is considered as follows. That is, when the tire rides on stones scattered on the road or protrusions on the road, the tire deforms so as to envelop the stone or the like. At this time, a large tension is locally applied to the cords, particularly cords in the second belt reinforcing layer, so that the breakage of belt cord is considered to be depended upon the presence or absence of tenacity (that is, cord tenacity×end count) enough to endure the above tension and the presence or absence of followability (elongation at break) to the deformation of the belt cord in the envelopment of the protrusion. The boundary condition causing such a breakage is a border line of the shadowed region in FIG. 2. Therefore, it is considered that only the cords having cord tenacity×end count and elongation at break within the shadowed region can overcome the tension in the riding over the stone or the like. Moreover, when the end count is too large, the rubber gauge between the cords becomes thinner, which causes a problem of separation failure at belt end.

As seen from Examples and Comparative Examples, the invention provides pneumatic radial tires having improved comfortability and durability by using the high strength and high modulus PVA fiber as a cord of the belt reinforcing layer, particularly second belt reinforcing layer in the tire and specifying the properties and arrangement of this cord.

What is claimed is:

1. A pneumatic radial tire comprising at least two belt reinforcing layers, at least one of which layers being a belt reinforcing layer composed of high modulus polyvinyl alcohol fiber (PVA) cords or PVA fiber cords embedded in rubber, characterized in that a cord tenacity S (kg) and a cord elongation at break U (%) of said PVA fiber cord taken out from said belt reinforcing layer and an end count T per 5 cm of said belt reinforcing layer at a crown center portion satisfy the following relationship:

$$12(S \times T) + 1000U > 28000 \tag{1}$$

and a cord diameter L (mm) of said PVA fiber cord and said end count T per 5 cm satisfy the following relationship:

$$(L \times T)/50 \times 100 < 80 \tag{2}$$

and a dynamic modulus of elasticity E' at 100° C. and 30 Hz of said PVA fiber cord taken out from said belt reinforcing layer satisfies the following relationship:

$$0.7 \times 10^{11} dyn/cm^2 < E' < 2.0 \times 10^{11} dyn/cm^2 \tag{3}$$

2. The pneumatic radial tire according to claim 1, wherein said dynamic modulus of the PVA fiber cord satisfies $1.0 \times 10^{11} dyn/cm^2 < E' < 1.5 \times 10^{11} dyn/cm^2$.

3. The pneumatic radial tire according to claim 1, wherein said PVA fiber cord contains not less than 5% by weight of insoluble matter when said cord is dissolved in dimethylsulfoxide at 120° C.

4. The pneumatic radial tire according to claim 1, wherein said belt reinforcing layer containing PVA fiber cords is an outermost belt reinforcing layer.

5. The pneumatic radial tire according to claim 4, wherein said belt reinforcing layer containing said PVA fiber cords has a fold structure that both outermost end portions in transverse direction of said layer are folded inward.

* * * * *